US012681444B2

(12) United States Patent
Park

(10) Patent No.: US 12,681,444 B2
(45) Date of Patent: Jul. 14, 2026

(54) OPERATION PREDICTION SYSTEM FOR MULTIPLE DEVICES

(71) Applicant: KOREA HYDRO & NUCLEAR POWER CO., LTD, Gyeongju-si (KR)

(72) Inventor: Dae Seung Park, Daejeon (KR)

(73) Assignee: KOREA HYDRO & NUCLEAR POWER CO., LTD, Gyeongju-si (KR)

( * ) Notice: Subject to any disclaimer, the term of this patent is extended or adjusted under 35 U.S.C. 154(b) by 544 days.

(21) Appl. No.: 18/257,077

(22) PCT Filed: Jan. 19, 2022

(86) PCT No.: PCT/KR2022/000970
§ 371 (c)(1),
(2) Date: Jun. 12, 2023

(87) PCT Pub. No.: WO2022/158842
PCT Pub. Date: Jul. 28, 2022

(65) Prior Publication Data
US 2024/0094686 A1    Mar. 21, 2024

(30) Foreign Application Priority Data
Jan. 20, 2021    (KR) ........................ 10-2021-0008289

(51) Int. Cl.
*G05B 13/04*    (2006.01)
*G05B 23/02*    (2006.01)
(Continued)

(52) U.S. Cl.
CPC ....... *G05B 13/048* (2013.01); *G05B 23/0283* (2013.01); *G06F 9/455* (2013.01);
(Continued)

(58) Field of Classification Search
CPC .......... G06F 11/00; G06F 9/455; G06F 17/30; G06F 16/29; G06F 3/048; G05B 19/418; G05B 23/02; G06Q 10/0639
(Continued)

(56) References Cited

U.S. PATENT DOCUMENTS 4,512,747 A * 4/1985 Hitchens ................ G09B 25/02
                                                     700/214
8,332,193 B2 * 12/2012 McKim ................ G09B 19/003
                                                     700/29
(Continued)

FOREIGN PATENT DOCUMENTS

EP        3 171 479        5/2017
EP        3 276 436 A1    1/2018
(Continued)

OTHER PUBLICATIONS

The Extended European Search Report for European Patent Application No. 22742818.2, dated Nov. 26, 2024.

*Primary Examiner* — Ronald D Hartman, Jr.

(57) ABSTRACT

An operation prediction system for multiple devices, according to one embodiment of the present invention, comprises: a control unit; a first device of which the operation state is changed by being controlled by the control unit; a second device which is linked to the first device; a prediction input unit which receives a prediction input which is an input for predicting the operation state to be changed of the first device; and a state prediction unit which predicts operation prediction information including information on the operation state of the first device, which is to be changed by the controlling of the control unit, and information on the impact on the second device as a result of the operation state to be changed of the first device.

6 Claims, 2 Drawing Sheets

1

(51) Int. Cl.

| | | |
|---|---|---|
| *G06F 9/455* | (2018.01) | |
| *G06F 11/00* | (2006.01) | |
| *G06F 16/29* | (2019.01) | |
| *G06Q 10/0639* | (2023.01) | |

(52) U.S. Cl.
CPC .............. *G06F 11/00* (2013.01); *G06F 16/29* (2019.01); *G06Q 10/0639* (2013.01)

(58) Field of Classification Search
USPC .......................................................... 700/83
See application file for complete search history.

(56) References Cited

U.S. PATENT DOCUMENTS

| | | | | | |
|---|---|---|---|---|---|
| 8,977,527 | B2 * | 3/2015 | McKim | ................ | G09B 19/003 |
| | | | | | 700/29 |
| 9,904,746 | B2 * | 2/2018 | McKim | .................... | G09B 9/00 |
| 10,198,536 | B2 * | 2/2019 | Rathgeb | ................. | G05B 17/02 |
| 2008/0027704 | A1 * | 1/2008 | Kephart | ........... | G05B 19/41885 |
| | | | | | 703/22 |
| 2012/0203508 | A1 | 8/2012 | Hamzaoui et al. | | |
| 2013/0116802 | A1 * | 5/2013 | Friman | .................. | G05B 17/02 |
| | | | | | 700/30 |
| 2017/0248939 | A1 | 8/2017 | Shimura | | |
| 2018/0365137 | A1 | 12/2018 | Millar | | |
| 2020/0081421 | A1 * | 3/2020 | Dayama | ............. | G05B 19/4184 |
| 2021/0011466 | A1 | 1/2021 | Kephart et al. | | |

FOREIGN PATENT DOCUMENTS

| | | | |
|---|---|---|---|
| JP | 2018-81354 | A | 5/2018 |
| JP | 2019-91206 | A | 6/2019 |
| JP | 6529690 | B1 | 6/2019 |
| KR | 10-2018-0119857 | A | 11/2018 |
| KR | 10-2019-0070168 | A | 6/2019 |
| KR | 10-2020-0029742 | A | 3/2020 |

* cited by examiner

OPERATION PREDICTION SYSTEM FOR MULTIPLE DEVICES

CROSS-REFERENCE TO RELATED APPLICATIONS

This application is the National Stage filing under 35 U.S.C. 371 of International Application No. PCT/KR2022/000970, filed on Jan. 19, 2022, which claims the benefit of Korean Patent Application No. 10-2021-0008289 filed on Jan. 20, 2021, the contents of which are all hereby incorporated by reference herein in their entirety.

TECHNICAL FIELD

The present disclosure relates to an operation prediction system for multiple devices.

BACKGROUND ART

In a facility equipped with various devices, such as power plants and factories (hereinafter referred to as "power plants, etc."), multiple devices may be interlocked and operated.

Typically, workers who operate these devices predict the operation on the basis of their knowledge before operating the devices.

However, when a device is operated on the basis of the knowledge that the worker has, there are cases where the device operates differently from the worker's expectation for some reasons that the worker did not expect.

In addition, there are cases where a worker has deep knowledge about a device for which the worker is responsible, but does not have deep knowledge about another device that is interlocked with the corresponding device. In this case, even if the worker operates the corresponding device within an expected range of the worker, there may be some case where the worker cannot recognize a possibility of problem occurring in the interlocked device.

DISCLOSURE

Technical Problem

An object to be solved by the present disclosure is to provide an operation prediction system for multiple devices, in which a user is allowed to recognize in advance an impact of control before changing an operation state by controlling at least one device among the multiple devices.

Objects of the present disclosure are not limited to the object mentioned above, and other objects not mentioned will be clearly understood by those skilled in the art from the following description.

Technical Solution

An operation prediction system for multiple devices according to an embodiment of the present disclosure to solve the above problems includes: a controller; a first device controllable by the controller to have an operation state changed; a second device subject to a change in the operation state of the first device; a prediction input unit configured to receive a prediction input, which is an input for predicting an operation state of the first device to be changed by a control of the controller and an impact on the second device; and a state prediction unit configured to, when the prediction input is input, on the basis of state information on the first device at a time when the prediction input is input and state information on the second device at the time when the prediction input is input, predict operation prediction information that includes information on an operation state of the first device to be changed by a control of the controller in a state of the first device at the time when the prediction input is input and information on an impact on the second device due to the operation state of the first device to be changed.

In order for the state prediction unit to determine the state information on the first device at the time when the prediction input is input and the state information on the second device at the time when the prediction input is input, the operation prediction system may further include: a first information acquisition unit configured to, when the prediction input is input, acquire real-time state information on the first device and transmit the acquired state information to the state prediction unit; and a second information acquisition unit configured to, when the prediction input is input, acquire real-time state information on the second device and transmits the acquired state information to the state prediction unit.

The operation prediction system may further include a control input unit configured to receive a plurality of operation inputs for inducing operation of the first device, and the controller may control the first device when the plurality of operation inputs is input, and the prediction input may include a plurality of corresponding prediction inputs respectively corresponding to the plurality of operation inputs.

The operation prediction system may further include: an operation record database communicatively connected to the state prediction unit and configured to, when one operation input among the plurality of operation inputs is input to the control input unit, record operation record information that includes information on the input operation input, first pre-state information which is state information on the first device at a time before the operation input is input, first post-state information which is state information on the first device at a time after the operation input is input, second pre-state information which is state information on the second device at a time before the operation input is input, second post-state information which is state information on the second device at a time after the operation input is input, and when one corresponding prediction input among the plurality of corresponding prediction inputs is input to the prediction input unit, the state prediction unit may predict the operation prediction information on the basis of state information on the first device at the time when a corresponding prediction input is input, state information on the second device at the time when a corresponding prediction input is input, and the operation record information.

When one corresponding prediction input among the plurality of corresponding prediction inputs is input to the prediction input unit, if a plurality of operation record information recorded in the operation record database has matching information, which is operation record information that includes information on the operation input corresponding to the corresponding prediction input inputted to the prediction input unit, the first pre-state information matching the state information of the first device at the time when the corresponding prediction input is input to the prediction input unit, and the second pre-state information matching the state information of the second device at the time when the corresponding prediction input is input to the prediction input unit, the state prediction unit may predict the operation prediction information on the basis of the first post-state information and the second post-state information included in the matching information.

The state prediction unit may include a simulator that simulates operations of the first device and the second device on the basis of the state information on the first device at the time when the corresponding prediction input is input to the prediction input unit, the state information on the second device at the time when the corresponding prediction input is input to the prediction input unit, and the corresponding prediction input to the prediction input unit, and when the matching information does not exist, the operation prediction information may be predicted on the basis of information simulated by the simulator.

The state prediction unit may include a simulator that simulates operations of the first device and the second device on the basis of the state information on the first device at the time when the corresponding prediction input is input, the state information on the second device at the time when the corresponding prediction input is input, and information on the corresponding prediction input, and the operation prediction information may be predicted on the basis of simulated information by the simulator.

The operation prediction system may further include a display unit configured to display, on the basis of the operation prediction information, on the screen, the information on the operation state of the first device to be changed by the control of the controller and the information on the impact on the second device by the operation state of the first device to be changed.

The operation prediction system further comprises: a first information acquisition unit configured to acquire real-time state information on the first device and transmit the acquired information to the display unit; and a second information acquisition unit configured to acquire real-time state information on the second device and transmit the acquired information to the display unit, and the display unit may display a current state of the first device and a current state of the second device together on the screen on the basis of the real-time state information on the first device and the real-time state information on the second device.

An operation prediction system for multiple devices according to another embodiment of the present disclosure includes: a first device; a second device subject to a change in the operation state of the first device; an input unit configured to receive an operation input, which is an input to change an operation state of the first device, and a prediction input that is to predict an operation state of the first device to be changed by the operation input and an impact on the second device due to the change in the operation state of the first device; a controller configured to control the first device so that the operation state of the first device is changed according to the operation input when the operation input is input; and a state prediction unit configured to, when the prediction input is input, on the basis of state information on the first device at a time when the prediction input is input and state information on the second device at the time when the prediction input is input, predict information on an operation state of the first device to be changed according to the prediction input and information on an impact on the second device due to the operation state of the first device to be changed.

Other specific details of the invention are included in the detailed description and drawings.

Advantageous Effects

According to embodiments of the present disclosure, at least the following effects are provided.

According to the present disclosure, before a user changes an operation state of a specific device, the user may be able to check information on a situation when the operation state of the specific device is changed according to the user's intention.

Accordingly, the user may be able to determine whether to actually operate the specific device after recognizing a complex situational change that can occur if the operation state of the specific device is changed from the current state, thereby preventing accidents caused by operational deficiencies in advance.

That is, according to the present disclosure, it is possible to secure stability of control when the user controls at least some of multiple devices.

Effects according to the present disclosure are not limited by the contents exemplified above, and more various effects are included in the present specification.

DESCRIPTION OF DRAWINGS

FIG. 1 is a block diagram of an operation prediction system for multiple devices according to an embodiment of the present disclosure.

FIG. 2 is a block diagram of an operation prediction system for multiple devices according to another embodiment of the present disclosure.

MODE FOR DISCLOSURE

Advantages and features of the present disclosure and a method of achieving the same should become clear with embodiments described in detail below with reference to the accompanying drawings. However, the present disclosure is not limited to the embodiments disclosed below and may be realized in various other forms, and the present embodiments make the disclosure complete and are provided to completely inform one of ordinary skill in the art to which the present disclosure pertains of the scope of the disclosure, and the present disclosure is defined only by the scope of the claims.

In addition, embodiments herein will be described with reference to cross-sectional views and/or schematic views, which are ideal exemplary views of the present disclosure. Therefore, the form of an exemplary view may be deformed due to a manufacturing technique and/or an allowable error. In addition, in each drawing of the present disclosure, each element may have been somewhat enlarged or reduced in consideration of convenience of explanation. Like reference numerals refer to like elements throughout the specification.

Hereinafter, the term "device" used herein may refer to a machine, tool, facility, etc. mounted or installed according to a specific purpose.

Hereinafter, the present disclosure will be described with reference to drawings for explaining an operation prediction system for multiple devices according to an embodiment of the present disclosure.

Figure 1:
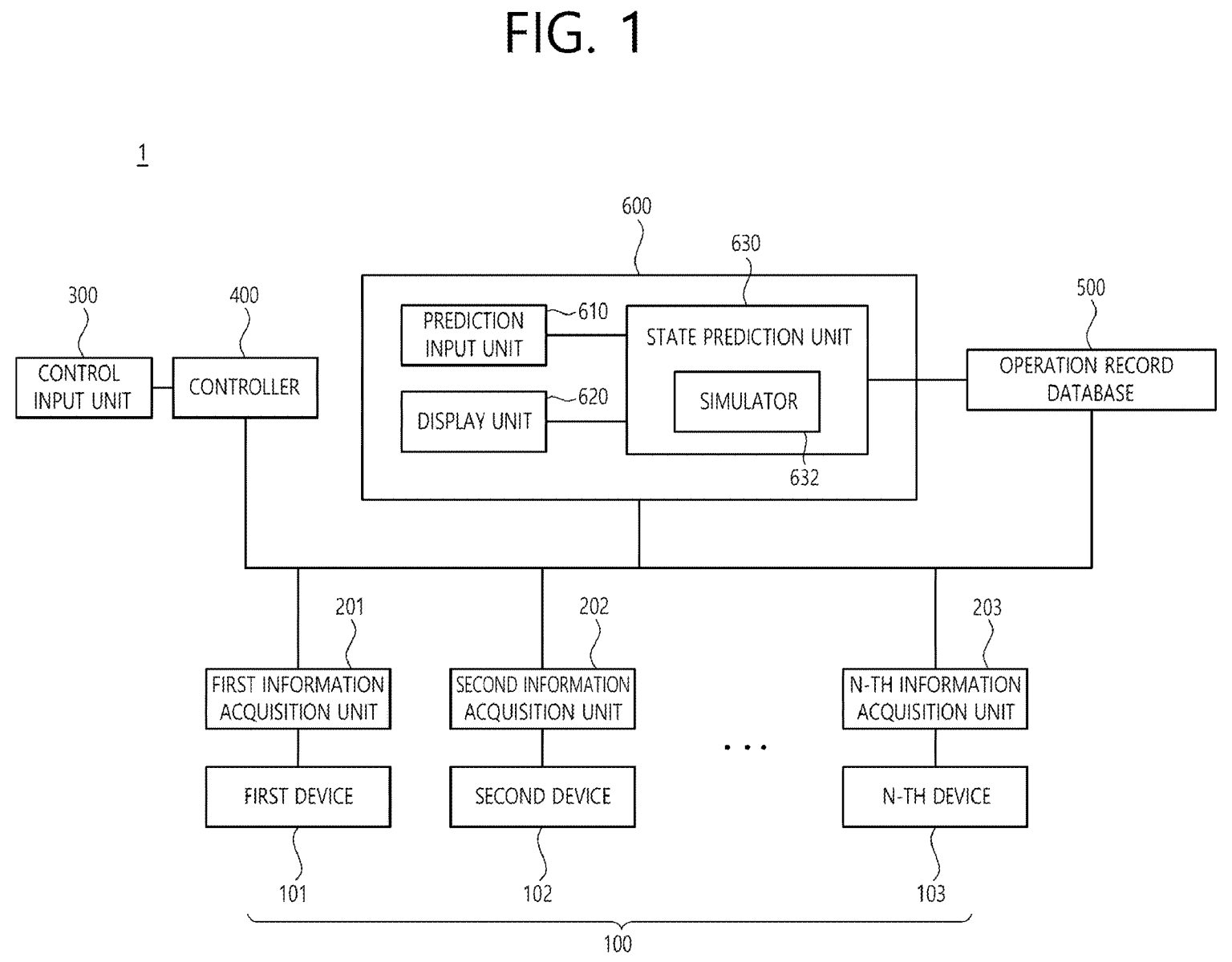

FIG. 1 is a block diagram of an operation prediction system for multiple devices according to an embodiment of the present disclosure.

As shown in FIG. 1, an operation prediction system 1 for multiple devices according to an embodiment of the present disclosure includes multiple devices 100, a plurality of information acquisition units 201, 202, and 203, a prediction system 600, a control input unit 300, a controller 400, and an operation record database 500.

Referring to FIG. 1, the respective components included in the operation prediction system 1 for multiple devices according to an embodiment of the present disclosure may be connected by wire or wireless to communicate with each other.

For example, the respective components included in the operation prediction system 1 for multiple devices according to an embodiment of the present disclosure may be connected via a network to exchange data with each other.

Alternatively, each component included in the operation prediction system 1 for multiple devices according to an embodiment of the present disclosure may be wired and connected to each other to exchange data.

First, the multiple devices 100 may be devices in an interdependent relationship in which one or more other devices are affected by the operation of each other. In addition, the multiple devices 100 may be devices having an interdependent relationship in which when an operation state of one device 100 is changed, another device or several other devices are affected accordingly.

In this case, the interdependent relationship may include a relationship in which an operation state of another device is changed when a specific device among the multiple devices 100 is operated or an operation state of the specific device is changed.

In addition, the interdependent relationship may include various relationships, such as a relationship in which when a specific device among the multiple devices 100 is operated or an operation state of the specific device is changed, a load is applied to another device, or a relationship in which another device is heated, or a malfunction occurs in another device, or an accident occurs at a place where another device is installed due to influence on the another device, or the specific device and another device are interlocked and operated.

For example, the multiple devices 100 may be multiple devices installed at a power plant or the like. For example, the multiple devices may be devices installed in various systems (an information processing system, a vibration monitoring system, a radiation monitoring system, a main steam-line system, etc.) of a power plant. In another example, the multiple devices 100 may be manufacturing devices installed at a factory. In this case, the multiple devices 100 may be provided not to receive other signals, except for a control signal by the controller 400, in order to prevent a malfunction due to an erroneous signal. However, this is illustrative and the present disclosure is not limited thereto.

As shown in FIG. 1, the multiple devices 100 may include a first device 101, a second device 102 . . . , and an n-th device 103. Here, the number of devices 100 may vary depending on the size, nature, and the like of a facility where the devices are installed.

Meanwhile, the multiple devices 100 may be connected to other components of the operation prediction system 1 for the multiple devices according to an embodiment of the present disclosure by wire or wirelessly and communicate with each other.

Meanwhile, the control input unit 300 is a component capable of receiving an input for controlling the multiple devices 100. In addition, the controller 400 is a component that controls the multiple devices 100 according to the input of the control input unit 300.

Specifically, the control input unit 300 may be provided to receive an operation input for inducing operation of multiple devices. For example, the control input unit 300 may be an input device capable of receiving an operation input for changing at least one device among the multiple devices to any of various operation states. For example, the control input unit 300 may be an input device (e.g., a mouse, a keyboard, a touch screen, etc.) capable of receiving an input for controlling the multiple devices 100.

In addition, the controller 400 may be a processing unit that controls the multiple devices 100 according to an operation input to the control input unit 300. Specifically, the controller 400 may be provided to receive a manipulation signal including information on an operation input from the control input unit 300 in a wired or wireless manner, and control the multiple devices 100 in response to the operation signal. For example, the controller 400 may be provided as a processing unit installed in a desktop, a laptop, a workstation, a PDA, a smart phone, or the like.

For example, the controller 400 may be a processing unit installed at an operation console of a main control room of a power plant, and the control input unit 300 may be an input device installed at the operation console of the main control room of the power plant.

Meanwhile, the information acquisition units 201, 202, and 203 are components respectively connected to (or included in) the multiple devices 100 to acquire real-time state information on each device. For example, the multiple devices 100 include a first information acquisition unit 201 for acquiring state information on the first device 101 in real time, and a second information acquisition unit 202 for acquiring state information on the second device 102 in real time, . . . and an n-th information acquisition unit 203 for acquiring state information on the n-th device 103 in real time. Alternatively, the information acquisition units 201, 202, and 203 may be provided to acquire state information on the device at intervals set by a user instead of acquiring the state information in real time.

In the above description and FIG. 1, it is shown that each information acquisition unit is connected to one another of multiple devices, but this is only exemplary. In another example, the multiple devices 100 may be connected to one information acquisition unit that acquires state information on each of the multiple devices 100.

Meanwhile, the state information on the devices acquired by the information acquisition units 201, 202, and 203 may be information including information related to the operation of each device.

For example, assuming that the first device 101 is a device including a pipe where a valve is installed, state information acquired by the first information acquisition unit 201 may include whether the valve is opened or closed, an open degree of the valve, information on a flow rate of the pipe, information on a flow velocity of the fluid in the pipe, and the like. The above description is provided by way of example to aid understanding, and the present disclosure is not limited to the above example.

To this end, the information acquisition units 201, 202, and 203 may include a sensor installed in the device 100 to sense information related to state information, a measuring device for measuring information related to state information, an imaging device for capturing images of the multiple devices, and/or a device capable of detecting information related to state information on the multiple devices 100, so that real-time state information on the multiple devices is acquired.

Meanwhile, the operation record database 500 may be a database communicatively connected to the state prediction unit 630, the multiple information acquisition units 201, 202, and 203, and/or the multiple devices 100.

In the operation record database 500, when an operation input is input to the control input unit 300, operation record information including information on the operation input and state information on equipment affected by the operation input before/after the input is recorded. In the operation record database 500, a plurality of operation record information is recorded according to an operation input that was input to the control input unit 300 in the past.

For example, the plurality of operation record information may be classified by type of operation input, a state before operation of a device in operation, a pre-state of a device affected by the operation, a state after operation of a device in operation, and a subsequent state of a device affected by the operation.

Hereinafter, for convenience of explanation, it will be described in the assumption that the control input unit 300 may receive a plurality of operation inputs for inducing operation of the first device 101 among the multiple devices and in response to the plurality of operation inputs, the controller 400 controls the first device 101 and the second device 102 is a device that is affected by a change in the operation state of the first device 101. In the following description, the operation of the first device 101 and the influence to the second device 102 are mainly described, but this is only exemplary. That is, when the first device is operated, no device or one or more devices may be affected by the operation of the first device 101.

Specifically, on the above assumption, operation record information may include the following information.

First, the operation record information includes information on an operation input inputted by a user through the control input unit 300 among the plurality of operation inputs.

In addition, the operation record information includes state information at a point in time before the operation state is changed by the controller 400 of the device whose operation state is changed in accordance with an operation input (hereinafter, referred to as a "driving device"). In addition, the operation record information includes state information on devices affected by the driving device at the same time (hereinafter, referred to as "subject devices").

In the above assumption as an example, the operation record information includes state information on the first device 101 and information on the state of the second device 102 at a point in time before the operation state of the first device 101 is changed by the controller 400. Specifically, the operation record information may include first pre-state information, which is state information on the first device 101 at a point in time before an operation input is input to the control input unit 300. In addition, the operation record information may include second pre-state information, which is state information on the second device 102 at a point in time before an operation input is input to the control input unit 300.

In addition, the operation record information includes state information on the driving device after the operation state of the driving device is changed. In addition, the operation record information includes state information on a subject device at the same time.

Using the above assumption as an example, the operation record information includes the state information on the first device 101 and the state of the second device 102 at the point in time after the operation state of the first device 101 is changed by the controller 400. information is included. Specifically, the operation record information may include first post state information at a point in time after an operation input is input to the control input unit 300. In addition, the operation record information may include state information after the second, which is state information on the second device 102 at a point in time after the operation input is input to the control input unit 300.

Meanwhile, in this case, the point in time before the operation input is input may be a time that is different by a time preset by a user from the time when the operation input is input. Likewise or similarly, the point in time after the operation input is input may be a time that is different by a time preset by a user from the point in time when the operation input is input.

In this case, in order to transmit, to the operation record database 500, the state information on the devices, which corresponds to a point in time before the operation input is input, the information acquisition units 201, 202, and 203 may be provided to record the acquired state information. For example, the information acquisition units 201, 202, and 203 may be provided to store the acquired real-time state information on the devices for a period of time set by the user.

That is, when an operation input is input to the control input unit 300, the operation record database 500 may store operation record information that includes information on the operation input, first pre-state information, first post-state information, second pre-state information, second post-state information.

That is, in the operation record database 500, the driving device (here, the first device) is operated in response to receiving any of various control instructions (here, control instructions in accordance with a plurality of operation inputs) by the controller 400 in various states, and a plurality of operation record information is stored indicating how the states of the driving device and a subject device (here, the second device) are changed.

Specifically, the plurality of operation record information may be previous operation records of devices. More specifically, a plurality of different operation record information may be recorded in the operation record database 500 depending on an input operation input, the first pre-state information, the second pre-state information, the first after state information, and the second after state information.

Meanwhile, a process for the operation record database 500 to acquire information on an operation input, first pre-state information, first post-state information, second pre-state information, and second post-state information may be as follows.

First, when an operation input is input to the control input unit 300, a manipulation signal including information on the operation input may be transmitted from the control input unit 300 to the controller 400. Upon receiving the manipulation signal, the controller 400 transmits a control signal including information on the operation input to the first device 101 in response to the manipulation signal. Upon receiving the control signal, the first device 101 may transmit information on the operation input, included in the control signal, to the operation record database 500.

Meanwhile, when the first device 101 receives the control signal, the first information acquisition unit 201 may be provided to first transmit the first pre-state information to the operation record database 500 and then transmit the first post-state information to the operation record database 500 after a set time.

Likewise or similarly, when the first device receives the control signal, the second information acquisition unit 202 may be provided to first transmit the second pre-state information to the operation record database 500 and then transmit the second post-state information to the operation record database 500 after a set time.

However, the above process is only an example and the present disclosure is not limited thereto. For example, the operation record database 500 may receive information on the operation input from the control input unit 300 and/or the controller 400. In addition, the first pre-state information and the first post-state information may be transmitted together after the set time (this is the same case with the second pre-state information and the second post-state information).

In addition, in the above example, it is described that the operation record database 500 generates and records operation record information from other components of the present disclosure, but the present disclosure is not limited thereto. For example, the operation record database 500 may be provided to receive information necessary for generating operation record information from a user and record the operation record information. Alternatively, the operation record database 500 may be provided to receive and record operation record information itself from the user.

Meanwhile, the prediction system 600 is a system that predicts operation and interaction of multiple devices. Specifically, the prediction system 600 may include a state prediction unit 630, a prediction input unit 610, and a display unit 620 as shown in FIG. 1.

First, the prediction input unit 610 is a component that receives a prediction input, which is an input for predicting an operation state of the first device 101 to be changed. For example, the prediction input unit 610 may be an input device (e.g., a mouse, a keyboard, a touch screen, etc.) capable of receiving a prediction input to multiple devices 100. Alternatively, for example, the prediction input unit 610 may be an input device installed in an operation console of a main control room of a power plant.

Specifically, the prediction input may include a plurality of corresponding prediction inputs respectively corresponding to a plurality of operation inputs.

More specifically, the control input unit 300 may be provided to input a plurality of operation inputs that change an operation state of the first device 101. In this case, the prediction input may include a plurality of corresponding prediction inputs in a one-to-one correspondence with a plurality of operation inputs.

Providing a better understanding, when the first device 101 includes a valve, the plurality of operation inputs include an input for opening the valve of the first device 101 (hereinafter, referred to as "first operation input"), and an input for closing the valve of the first device 101 (hereinafter, referred to as "second operation input"). In the above example, the prediction inputs may include a first corresponding prediction input, which is a corresponding prediction input to predict a case where the valve of the first device 101 is opened in response to the first operation input, and a second corresponding prediction input, which is a corresponding prediction input to predict a case where the valve of the first device 101 is closed in response to the second operation input.

Meanwhile, the prediction input unit 610 may be provided to transmit an input signal by the prediction input unit 610 to the state prediction unit 630, but to prevent a prediction signal of a prediction input from not being transmitted to the multiple devices 100 so that a malfunction does not occur in the multiple devices 100 due to the prediction input.

Meanwhile, the state prediction unit 630 is a component that predicts the operation of the multiple devices 100 when a prediction input is input to the prediction input unit 610. For example, the state prediction unit 630 may be a device that predicts the operation of the devices 100 according to a prediction input, or may be a recording medium containing software that predicts the operation of the devices 100 according to a prediction input.

Specifically, when a prediction input is input when a prediction input is input, the state prediction unit 630 predicts an operation of a driving device and an impact on a subject device. For example, in the above assumption, the state prediction unit 630 predicts an operation of the first device 101 and an impact on the second device 102 due to the operation of the first device 101.

Specifically, on the basis of state information on the first device 101 at a time when the prediction input is input and state information on the second device 102 at a time when the prediction input is input, the state prediction unit 630 predicts operations of the first device 101 and the second device 102.

on the basis of the above-described information in more detail, the state prediction unit 630 may be provided to predict operational prediction information that includes information on an operational state of the first device 101 to be changed if the first device 101 is controlled by the controller 400 in a state of the first device 101 at a time when a prediction input is input, and information on an impact on the second device 102 by the operation state of the first device 101 to be changed.

Meanwhile, the state prediction unit 630 may be communicatively connected to the information acquisition units 201, 202, and 203 to acquire state information on the first device 101 at a time when the prediction input is input and state information on the second device 102 at the time when the prediction input is input.

Specifically, when a prediction input is input to the prediction input unit 610, the state prediction unit 630 requests real-time state information from the information acquisition units 201, 202, and 203 according to the prediction input. For example, for each operational input corresponding to a corresponding one of a plurality of prediction inputs, the state prediction unit 630 may contain recorded impact information, which includes information on a driving device operated by a corresponding operation input and information on an impact on a subject device.

The state prediction unit 630 specifies a device requiring state information on the basis of the information included in the impact information, and requests real-time state information on the device requiring state information from the information acquisition units 201, 202, and 203.

For example, when a corresponding prediction input for predicting an operation of the first device 101 according to an operation input is input to the prediction input unit 610, the state prediction unit 630 requests real-time state information on the first device 101 and real-time state information on the second device 102 from the first information acquisition unit 201 and the second information acquisition unit 202, respectively.

The first information acquisition unit 201 and the second information acquisition unit 202 receiving the request for real-time state information transmit the corresponding information to the state prediction unit 630. As a result, the state prediction unit 630 acquires state information on the first device 101 at a time when a corresponding prediction input is input and state information on the second device 102 at the time when the corresponding prediction input is input.

Meanwhile, the state prediction unit 630 may be provided to predict operation prediction information on the basis of the state information on the first device 101 at the time when the corresponding prediction input is input, the state information on the second device 102 at the time when the corresponding prediction input is input, and operation record information.

More specifically, the state prediction unit 630 may be provided to predict operation prediction information that includes information on an operational state of the first device 101 to be changed if the first device 101 is controlled by the controller 400 as an operation input corresponding to a corresponding prediction input is input at a current time (at a time when the operation input is input), and information on an impact on the second device 102 due to the operation state of the first device 101 to be changed.

In this case, in order to acquire operation record information, the state prediction unit 630 may be communicatively connected to the operation record database 500. In addition, in the above example, it has been described that when the corresponding prediction input is input, the state prediction unit 630 requests real-time state information from information acquisition units connected to necessary devices on the basis of the impact information to acquire state information on the necessary devices, but the present disclosure is not limited thereto. In another example, the state prediction unit 630 may be provided to receive real-time state information on a necessary device from a user.

Specifically, when one corresponding prediction input among a plurality of corresponding prediction inputs is input to the prediction input unit, the state prediction unit 630 search the plurality of operation record information recorded in the operation record database 500 for operation record information (hereinafter, referred to as "matching information") that includes information on an operation input corresponding to the corresponding prediction input to the corresponding prediction input to 610, first pre-state information matching state information on the first device 101 at a time when the corresponding prediction input is input, and the second pre-state information matching state information on the second device at the time when the corresponding prediction input is input.

When matching information is found as a result of the search, the state prediction unit 630 predicts operation prediction information on the basis of first post-state information and second post-state information included in the matching information.

In this case, the operation prediction information includes the first post-state information and the second post-state information included in the matching information. Specifically, in this case, the first post-state information is information on an operation state of the first device 101 to be changed by a control, and the second post-state information is information on an impact on the second device 101 due to the operation state of the first device 101 to be changed.

Meanwhile, the state prediction unit 630 may be provided to predict operation prediction information on the basis of a result of simulating the operation of the driving device and the subject device according to a prediction input. To this end, the state prediction unit 630 may include a simulator 632 that simulates the operation of the driving device and the subject device according to a prediction input.

Specifically, in the above assumption, the simulator 632 may be provided to simulate the operation of the first device 101 and the second device 102 on the basis of state information on the first device 101 at a time when the prediction input is input, state information on the second device 102 at the time when the prediction input is input, and information on the prediction input.

For example, when matching information does not exist, the state prediction unit 630 may simulate the operation of the first device 101 and the second device 102 using the simulator 632 in order to acquire operation prediction information.

Specifically, when the corresponding prediction input is input, the simulator 632 simulates the operation of the first device 101 and the second device 102 using the state information on the first device 101 at a time when the corresponding prediction input is input, state information on the second device 102 at the time when the corresponding prediction input is input, and information on the corresponding prediction input as input values.

Meanwhile, information on normal operating conditions of the multiple devices 100 included in the operation prediction system 1 for multiple devices according to an embodiment of the present disclosure may be recorded in the simulator 632 in advance. For example, information on normal operating conditions may refer to information on conditions in which the device 100 does not experience malfunctions, damage, abnormal operation, or the like (hereinafter referred to as an abnormal state). As a result, the simulator 632 may conduct a simulation according to a corresponding prediction input on the basis of the aforementioned information on normal operating condition, and may determine whether the first device 101 and/or the second device 102 would enter an abnormal state if the first device 101 is operated according to an operational input.

That is, the simulator 632 conducts a simulation by using the state information on the first device 101 at the time when the corresponding prediction input is input, the state information on the second device 102 at the time when the corresponding prediction input is input, and the input corresponding prediction input as input values.

In addition, the simulator 632 acquires, as a result of the simulation, information on an operation state of the first device 101 to be changed by a control of the controller 400 on the basis of the operation input and information on an impact on the second device 102 due to the operation state of the first device 101 to be changed. Accordingly, the state prediction unit 630 acquires operation prediction information, which includes the information on the operation state of the first device 101 to be changed by a control of the controller 400 on the basis of the operation input and the information on the impact on the second device 102 due to the operation state of the first device 101 to be changed.

Meanwhile, the display unit 620 is a component that displays, on a screen, the information on the operation state of the first device 101 to be changed by a control of the controller 400 on the basis of the operation input and the information on the impact on the second device 102 due to the operation state of the first device 101 to be changed.

Here, the information on the operation state of the first device 101 to be changed, which is to be displayed on the screen, may be first post-state state or information on information on an operation of the first device 101 simulated by the simulator 632.

Likewise or similarly, the information on the operation state of the second device 102 to be changed, which is to be displayed on the screen, may be second post-state information or information on an operation of the second device 102 simulated by the simulator 632.

Meanwhile, on the screen, pre-recorded video representing a predicted state of the first device 101 and a predicted state of the second device 102 may be played, icons related thereto may be displayed, or characters representing the predicted state of the first device 101 and the predicted state of the second device 102 may be displayed.

Specifically, the operation prediction information may be provided so that the display unit 620 includes information on a text, an image, a video, and the like to be displayed on the screen. More specifically, in order for the display unit 620 to display the information on the operation state of the first device 101 to be changed by the control of the controller 400 on the basis of the operation prediction information and the information on the impact on the second device 102 due to the operation state of the first device to be changed, the first pre-state information, the first post-state information, information on the operation of the first device 101, the second pre-state information, the second post-state information, and the information on the operation of the second device 102 may include information such as images, videos, texts, and the like representing the state of the first device or the second device.

In addition, the display unit 620 may be provided to display a current state of the first device 101 and a current state of the second device 101 on the screen as well as the current state of the first device 101 and the current state of the second device 102.

Specifically, the display unit 620 may be provided to display, on the screen, the current state of the first device 101 and the second device 102 together on the basis of real-time state information on the first device 101 and real-time state information on the second device 102.

To this end, the display unit 620 may receive the real-time state information on the first device from the first information acquisition unit 201 and the real-time state information on the second device 102 from the second information acquisition unit 202.

To provide a better understanding, an example of how the display unit 620 displays a predicted state and a current state on the screen may be as follows.

For example, it is assumed that the first device 101 includes a pipe through which steam for rotating a turbine flows and a valve for opening and closing the pipe. It is also assumed that the second device 102 includes a turbine that rotates by the steam supplied by the first device 101.

For example, when the valve is currently closed, the screen of the display unit 620 shows videos, icons, and/or texts depicting a closed valve and a situation where steam does not move into the turbine. In this case, if a user inputs a corresponding prediction input before applying an operation input to partially open the valve (for example, 5% opening of the pipe), the screen shows a situation in which the valve is partially opened and steam is moving to the turbine.

In this case, when the state prediction unit determines that the turbine will be rotated on the basis of state information on the second device 102 acquired by the second information acquisition unit 202, the screen displays that the turbine rotates.

In another example, if it is determined that the turbine cannot rotate at present on the basis of the state information on the second device 102 acquired by the second information acquisition unit 202 (for example, a power loss situation), the screen shows that pressure increases in a turbine chamber due to the opening of the valve.

In yet another example, when an operation input is input in the current state on the basis of the normal operating conditions of the first and second devices, if the first device and the second device are in an abnormal state, corresponding information is displayed on the screen.

For convenience of explanation, it is assumed that the first device includes a pipe and a valve for discharging steam from a turbine chamber, and the second device includes a turbine.

In this case, when the second device is in a stopped state due to an accident such as a fire, steam discharged from a steam generator is discharged from the turbine chamber to the pipe of the first device. In this case, when the user presses an input for closing the pipe, the simulator simulates closing of the pipe and displays a situation where the pressure in the turbine room may increase or the turbine and/or pipe may be damaged. However, in this case, if there is an operation information record for the corresponding situation in the operation record database, the corresponding information may be displayed.

Hereinafter, information on the operation prediction system 2 for multiple devices according to another embodiment of the present disclosure will be described on the basis of the description of the operation prediction system 1 for multiple devices according to an embodiment of the present disclosure.

For convenience of explanation, the same contents as the previous embodiment will be omitted and the differences from the previous embodiment will be mainly described.

Figure 2:
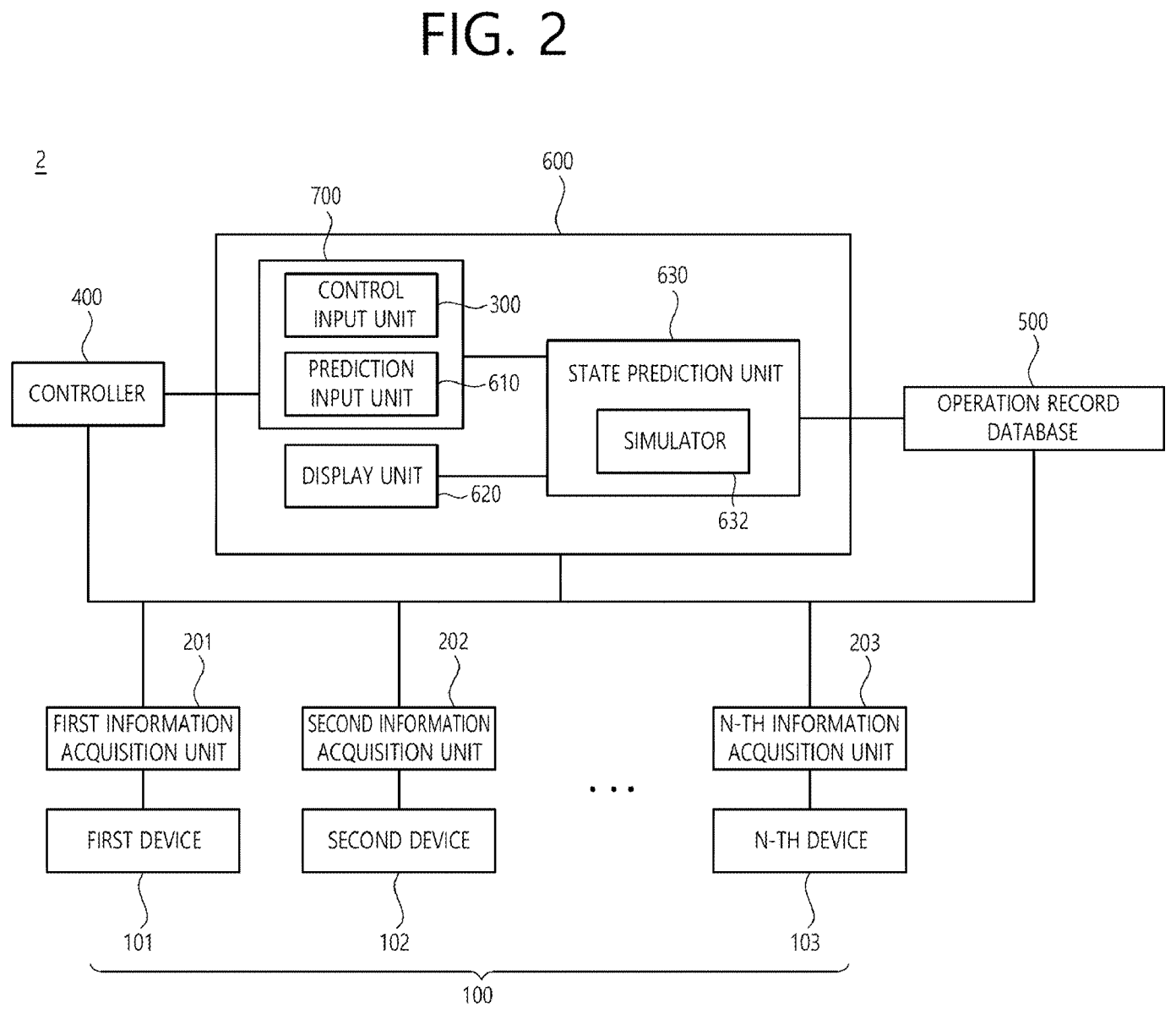

In order to describe the operation prediction system 2 for multiple devices according to another embodiment of the present disclosure, FIG. 2 is first described, and FIG. 2 is a block diagram of an operation prediction system for multiple devices according to another embodiment of the present disclosure.

As shown in FIG. 2, a prediction system 600 of this embodiment includes an input unit 700 unlike the previous embodiment.

Specifically, the input unit 700 may include a control input unit 300 and a prediction input unit 610. Alternatively, for example, the input unit 700 may be an input module provided to include the functions and/or configurations of the prediction input unit 610 and the control input unit 300 of the previous embodiment.

More specifically, the input unit 700 is provided to receive an operation input and a prediction input from the user. For example, the input unit 700 may include an input device capable of receiving an operation input and a prediction input. Alternatively, the input unit 700 may be an input device (e.g., a mouse, a keyboard, a touch screen, etc.) capable of receiving an input to control multiple devices 100. Alternatively, the prediction input unit 610 may be an input device installed at an operation console of a main control room of a power plant.

In this case, when receiving a manipulation input from a user, the input unit 700 transmits an operation signal to the controller 400 and the controller 400 controls the first device 101 according to the operation input. In addition, when receiving a prediction input from the user, the input unit 700 transmits an input signal according to the prediction input to the state prediction unit 630, and the state prediction unit 630 predicts an operation of the devices 100 according to the prediction input.

Meanwhile, the input unit 700 may be provided to enable inputting of a plurality of operation inputs that change an operation state of the first device 101. Also, in this case, the prediction input may include a plurality of corresponding prediction inputs in a one-to-one correspondence with the plurality of operation inputs. Since the corresponding prediction input and the plurality of operation inputs are the same as or similar to those described in the above-described embodiment, a description thereof will be omitted.

Meanwhile, the input unit 700 may be set to enable inputting of an operation input corresponding to a corresponding prediction input unit after the user inputs the corresponding prediction input. Alternatively, when the user inputs an operation input before inputting a corresponding prediction input, it may be set not to transmit a manipulation signal to the controller 400.

For example, the input unit 700 may be set such that as the user inputs a corresponding prediction input, the display unit 620 displays information on an operation state of the first device 101 to be changed by a control of the controller 400 on the basis of operation prediction information and information on an impact on the second device 102 due to the operation state of the first device to be changed and then an operation input corresponding to the corresponding prediction input is input.

Or, similarly, the input unit 700 may be set such that only when the information on the operation state of the first device 101 to be changed on the basis of operation prediction information and the information on the impact on the second device 102 due to the operation state of the first device are displayed on the screen, a manipulation signal is transmitted to the controller 400 if an operation input corresponding to a corresponding prediction input is input.

For example, after the information on the operation state of the first device 101 to be changed by the control of the controller 400 and the information on the impact on the second device 102 by the operation state of the first device to be changed are displayed on the screen, the input unit may be provided to display a pop-up window or a message in a similar form on the screen and receive an operation input from the user in response to the message.

More specifically, for example, the input unit 700 may be provided to display "Do you want to execute?" or a similar message on the screen where operation prediction information according to the corresponding prediction input is displayed, and when the user enters a confirmation or acceptance input, the input unit may be provided to transmit a manipulation signal to the controller 400 so that the first device operates. In this case, the confirmation or acceptance input is the operation input.

Interactions between other components and components of the operation prediction system 2 for multiple devices according to another embodiment of the present disclosure are the same as or similar to those described in the above-described embodiment, so a description thereof will be omitted.

In this case, the explanation provided in the above assumption is an example to aid understanding, and the scope of the present disclosure is not limited thereto.

A person skilled in the art of the technical field to which the present disclosure pertains would understand that the present disclosure can be implemented in various specific forms without altering its technical concept or essential features. Therefore, the embodiments described above should be understood as illustrative in all respects and not limiting. The scope of the present invention is defined by the claims set forth below, rather than the detailed description provided above, and should be interpreted to include all modifications or variations derived from the meaning and scope of the claims and the concept of equivalence.

The invention claimed is:

1. An operation prediction system for multiple devices, the system comprising:

a controller;

a first device controllable by the controller to have an operation state changed;

a second device subject to a change in the operation state of the first device;

a prediction input unit configured to receive a prediction input, which is an input for predicting an operation state of the first device to be changed by a control of the controller and an impact on the second device;

a state prediction unit configured to, when the prediction input is input, on the basis of state information on the first device at a time when the prediction input is input and state information on the second device at the time when the prediction input is input, predict operation prediction information that includes information on an operation state of the first device to be changed by a control of the controller in a state of the first device at the time when the prediction input is input and information on an impact on the second device due to the operation state of the first device to be changed; and a control input unit configured to receive a plurality of operation inputs for inducing operation of the first device, wherein the controller controls the first device when the plurality of operation inputs is input, and wherein the prediction input comprises a plurality of corresponding prediction inputs respectively corresponding to the plurality of operation inputs, and the operation prediction system, further comprising:

an operation record database communicatively connected to the state prediction unit and configured to, when one operation input among the plurality of operation inputs is input to the control input unit, record operation record information that includes information on the inputted operation input, first pre-state information which is state information on the first device at a time before the operation input is input, first post-state information which is state information on the first device at a time after the operation input is input, second pre-state information which is state information on the second device at a time before the operation input is input and second post-state information which is state information on the second device at a time after the operation input is input, wherein when one corresponding prediction input among the plurality of corresponding prediction inputs is input to the prediction input unit, the state prediction unit predicts the operation prediction information on the basis of state information on the first device at the time when the corresponding prediction input is input, state information on the second device at the time when the corresponding prediction input is input and the operation record information, and wherein when one corresponding prediction input among the plurality of corresponding prediction inputs is input to the prediction input unit, if a plurality of operation record information recorded in the operation record database has matching information, which is operation record information that includes information on the operation input corresponding to the corresponding prediction input inputted to the prediction input unit, the first pre-state information matching the state information of the first device at the time when the corresponding prediction input is input to the prediction input unit and the second pre-state information matching the state information of the second device at the time when the corresponding prediction input is input to the prediction input unit, the state prediction unit predicts the operation prediction information on the basis of the first post-state information and the second post-state information included in the matching information.

2. The operation prediction system of claim 1, further comprising:

in order for the state prediction unit to determine the state information on the first device at the time when the prediction input is input and the state information on the second device at the time when the prediction input is input, a first information acquisition unit configured to, when the prediction input is input, acquire real-time state information on the first device and transmit the acquired state information to the state prediction unit; and a second information acquisition unit configured to, when the prediction input is input, acquire real-time state information on the second device and transmits the acquired state information to the state prediction unit.

3. The operation prediction system of claim 1, wherein the state prediction unit comprises a simulator that simulates operations of the first device and the second device on the basis of the state information on the first device at the time when the corresponding prediction input is input to the prediction input unit, the state information on the second device at the time when the corresponding prediction input is input to the prediction input unit, and the corresponding prediction input to the prediction input unit, and when the matching information does not exist, the operation prediction information is predicted on the basis of information simulated by the simulator.

4. The operation prediction system of claim 1, further comprising:

a display unit configured to display, on the basis of the operation prediction information, on the screen, the information on the operation state of the first device to be changed by the control of the controller and the information on the impact on the second device by the operation state of the first device to be changed.

5. The operation prediction system of claim 4, further comprising:

a first information acquisition unit configured to acquire real-time state information on the first device and transmit the acquired information to the display unit; and a second information acquisition unit configured to acquire real-time state information on the second device and transmit the acquired information to the display unit, wherein the display unit further displays a current state of the first device and a current state of the second device on the screen on the basis of the real-time state information on the first device and the real-time state information on the second device.

6. An operation prediction system for multiple devices, the system comprising:

a first device;

a second device subject to a change in the operation state of the first device;

an input unit configured to receive a plurality of operation inputs, which are inputs to change an operation state of the first device, and a prediction input that is to predict an operation state of the first device to be changed by the plurality of operation inputs and an impact on the second device due to the change in the operation state of the first device;

a controller configured to control the first device so that the operation state of the first device is changed according to the plurality of operation inputs when each of the plurality of operation inputs is input; and a state prediction unit configured to, when the prediction input is input, on the basis of state information on the first device at a time when the prediction input is input and state information on the second device at the time when the prediction input is input, predict operation prediction information that includes information on an operation state of the first device to be changed if the operation inputs is input and information on an impact on the second device due to the operation state of the first device to be changed, and wherein the prediction input comprises a plurality of corresponding prediction inputs respectively corresponding to the plurality of operation inputs, and the operation prediction system, further comprising:

an operation record database communicatively connected to the state prediction unit and configured to, when one operation input among the plurality of operation inputs is input to the input unit, record operation record information that includes information on the inputted operation input, first pre-state information which is state information on the first device at a time before the operation input is input, first post-state information which is state information on the first device at a time after the operation input is input, second pre-state information which is state information on the second device at a time before the operation input is input and second post-state information which is state information on the second device at a time after the operation input is input, wherein when one corresponding prediction input among the plurality of corresponding prediction inputs is input to the input unit, the state prediction unit predicts the operation prediction information on the basis of state information on the first device at the time when the corresponding prediction input is input, state information on the second device at the time when the corresponding prediction input is input and the operation record information, and wherein when one corresponding prediction input among the plurality of corresponding prediction inputs is input to the input unit, if a plurality of operation record information recorded in the operation record database has matching information, which is operation record information that includes information on the operation input corresponding to the corresponding prediction input inputted to the input unit, the first pre-state information matching the state information of the first device at the time when the corresponding prediction input is input to the input unit and the second pre-state information matching the state information of the second device at the time when the corresponding prediction input is input to the input unit, the state prediction unit predicts the operation prediction information on the basis of the first post-state information and the second post-state information included in the matching information.

* * * * *